(12) United States Patent
Colby et al.

(10) Patent No.: US 6,735,587 B2
(45) Date of Patent: May 11, 2004

(54) MAINTAINING PRE-COMPUTED AGGREGATE VIEWS INCREMENTALLY IN THE PRESENCE OF NON-MINIMAL CHANGES

(75) Inventors: Latha S. Colby, Mountain View, CA (US); William J. McKenna, Santa Cruz, CA (US); David G. Wilhite, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/917,436

(22) Filed: Jul. 28, 2001

(65) Prior Publication Data

US 2002/0111955 A1 Aug. 15, 2002

Related U.S. Application Data

(60) Provisional application No. 60/221,599, filed on Jul. 28, 2000.

(51) Int. Cl.[7] ............................................. G06F 17/30
(52) U.S. Cl. ................................................. 707/4; 707/5
(58) Field of Search ......................................... 707/4, 5

(56) References Cited

U.S. PATENT DOCUMENTS

| | | | |
|---|---|---|---|
| 6,094,651 A | * 7/2000 | Agrawal et al. | 707/5 |
| 6,199,063 B1 | * 3/2001 | Colby et al. | 707/4 |
| 6,374,263 B1 | 4/2002 | Bunger et al. | 707/201 |
| 6,418,431 B1 | * 7/2002 | Mahajan et al. | 707/4 |

OTHER PUBLICATIONS

I.S. Mumick et al., "Maintenance of Data Cubes and Summary Tables in a Warehouse", Materialized Views Techniques, Implementations, and Applications, The MIT Press, Cambridge Massachusetts, London, England, pp 387–407. (no date).

D. Quass, "Maintenance Expressions for Views with Aggregation", Proceedings of the Workshop on Materialized Views: Techniques and Applications, Jun. 7, 1996, Montreal, Canada, pp 110–118.

* cited by examiner

*Primary Examiner*—Charles Rones
(74) *Attorney, Agent, or Firm*—Janaki K. Davda; Konrad, Raynes & Victor LLP

(57) ABSTRACT

Methods and apparatus implementing a technique for incrementally maintaining pre-computed aggregate views. In general, the technique includes: receiving a pre-computed aggregate view derived from one or more base tables. The pre-computed aggregate view including a pre-computed aggregate table and a view definition. The view definition including aggregation functions that can be any combination of sum, sum distinct, count(*), count distinct, min, and max. The view definition further including expressions that may be nullable. The technique includes receiving changes to the base table, the changes being non-minimal. The technique includes analyzing the view definition, including the type of aggregation functions and the nullability and data type of columns and expressions in the view definition, to reduce or eliminate the use of information in base tables in order to define the incremental modifications to the pre-computed aggregate table.

12 Claims, 5 Drawing Sheets

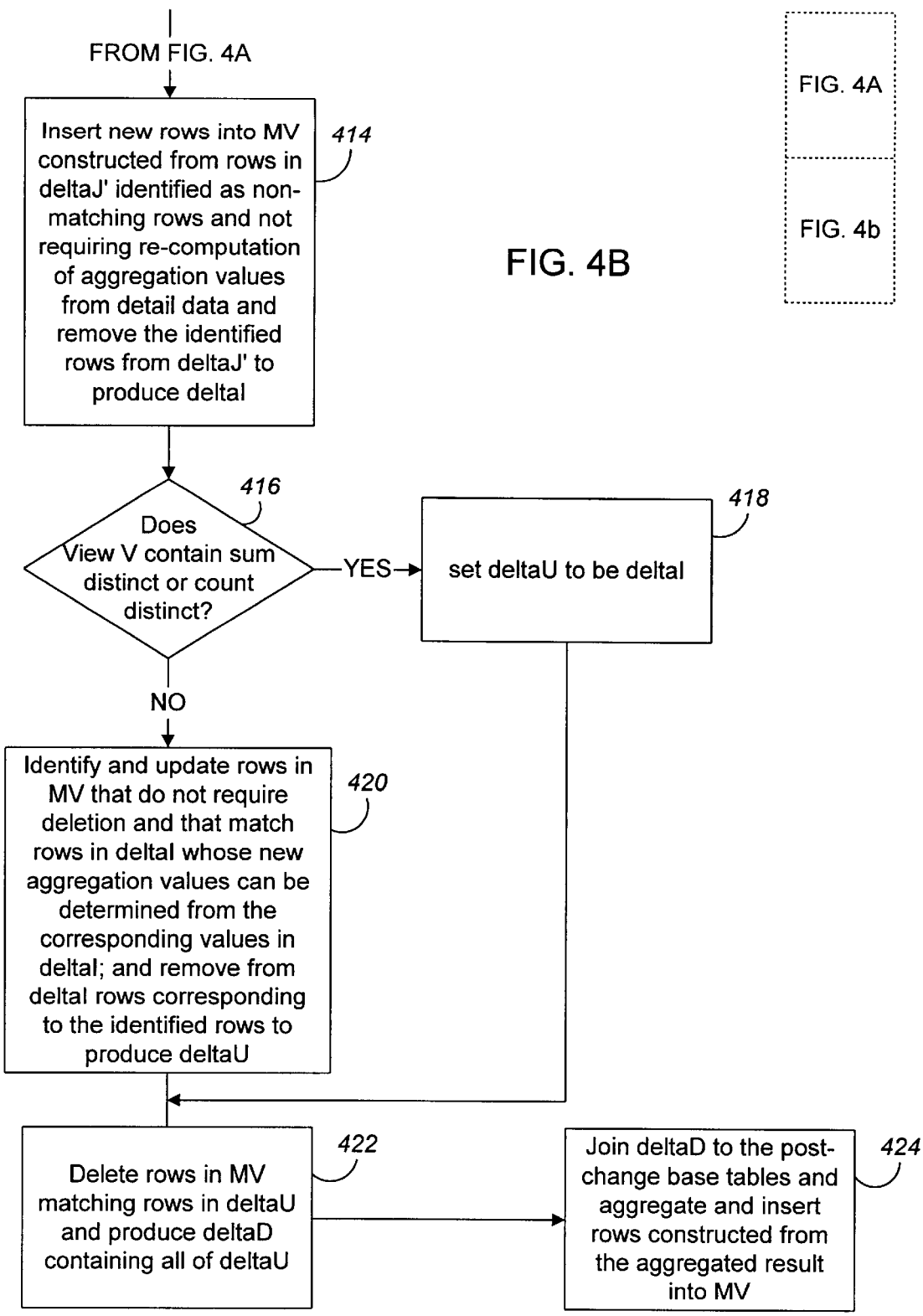

MAINTAINING PRE-COMPUTED AGGREGATE VIEWS INCREMENTALLY IN THE PRESENCE OF NON-MINIMAL CHANGES

CROSS-REFERENCE TO RELATED APPLICATIONS

This application claims benefit of U.S. Provisional Application No. 60/221,599, filed Jul. 28, 2000, which is incorporated herein by reference in its entirety.

BACKGROUND OF THE INVENTION

The present invention relates to maintaining pre-computed aggregate views incrementally in the presence of non-minimal changes.

A view represents a query over tables in a database. A pre-computed view is a view that has the result of the view definition query materialized in a result table. A pre-computed aggregate view is a special case of a pre-computed view when the view definition contains aggregation. Aggregate query processing in large data warehouses can be computationally intensive. Pre-computation is an approach that can be used to speed up aggregate queries.

A pre-computed view (or more specifically, its associated result table) may become "out-of-synch" with the tables that it is derived from (often known as base or detail tables) when the data in those tables (i.e., the details data) are modified. That is, the information in the result table is no longer accurate because the data from which the information was derived, i.e., the detail data in the base tables, has been changed. Thus, it is the result table that must be modified in order to keep the pre-computed view "in-synch" with the detail tables. This process is known as view maintenance.

A result table, also known as a materialized table or a pre-computed table, will be referred to as a pre-computed table. A pre-computed view is generally known as a materialized view but will be referred to as a pre-computed view. When a pre-computed view is a pre-computed aggregate view, its associated pre-computed table, generally known as a pre-computed aggregate or aggregate, will be referred to as a pre-computed aggregate table.

A pre-computed aggregate view can be maintained either "incrementally" using the changes to the detail data or by re-computing the view from the detail data. Incremental maintenance can be extremely fast for some types of pre-computed aggregate views and operations and more time-consuming for others.

Changes to the detail data can be a set of inserted rows, a set of deleted rows, a set of updated rows, or a combination of these. A set of updated rows can be treated as a set of deleted rows and a set of inserted rows. It is not necessary to "convert" an update of a row in the base table into a delete followed by an insert. However, the effect of the update could be treated as a delete followed by an insert for the purposes of computing the incremental changes to the materialized table.

Changes to detail data, when represented as a set of deleted rows and a set of inserted rows, are weakly minimal if the set of deletes is a subset of the rows in the (pre-modified) version of the detail table. They are strongly minimal if the intersection of the set of deletes and inserts is empty and the conditions for weak minimality are satisfied. In order to guarantee strong or weak minimality, the changes must be preprocessed to produce minimal change sets.

Non-minimal changes are those that are not guaranteed to be minimal but can be. Note that a non-minimal change does not preclude strong or weak minimality.

Although the term "sets" is used here, the changes could be multisets and the discussion on minimality is not limited to pure relational sets. That is, the discussion also applies to bags, which are also referred to as multisets. Terms such as subset and intersection refer to bag subset and bag-based minimal intersection where multiplicities are taken into account.

There are various scenarios under which maintenance has to deal with changes that are not guaranteed to be strongly or weakly minimal. A transaction that makes incremental changes to a base table might insert a row and later update that row. The update may be represented as a delete of the newly inserted row and an insert. So, the set of "deleted" rows and the set of "inserted" rows are not a strongly minimal set of changes since the intersection of these sets is not empty. They are also not a weakly minimal set because the set of deleted rows is not in the original table. Another scenario which results in changes that are not guaranteed to be strongly or weakly minimal is deferred view maintenance. A view may be maintained, in a separate transaction, after a series of changes have been made to the detail tables by other transactions. This type of maintenance is called deferred view maintenance. Since a set of rows inserted by one transaction may be deleted by another, the set of changes may not be weakly minimal. It is possible to convert the sets into ones that are strongly minimal or weakly minimal by performing various operations that reduce the sets to minimal ones. Preprocessing is usually needed in conventional methods requiring change sets to be minimal.

SUMMARY OF THE INVENTION

The present invention provides methods and apparatus, including computer program products, for maintaining pre-computed aggregate views incrementally in the presence of non-minimal changes to base tables.

In general, in one aspect, the present invention provides a method for maintaining pre-computed aggregate views. The method includes receiving a pre-computed aggregate view derived from one or more base tables. The pre-computed aggregate view includes a pre-computed aggregate table and a view definition. The view definition includes aggregation functions that can be any combination of sum, sum distinct, count(*), count distinct, min, and max. The view definition may include expressions that may be nullable. The method includes receiving changes to the base table. The changes may be non-minimal. The method includes defining and applying a set of incremental modifications to the pre-computed aggregate table, wherein modifications may include any combination of inserts, deletes, and updates. The method includes defining a first table wherein each record, representing an aggregated group of changes, shows, for each aggregation function, the contributions of base table changes that are insertions for that group and the contributions of base table changes that are deletions for that group. Each record in the first table further includes the number of changes that are insertions and the number of changes that are deletions for the group represented by the record. The method includes defining the incremental modifications to the pre-computed aggregate table using some combination of information in the first table, the pre-computed aggregate table, and the one or more base tables from which the pre-computed view is derived. The method further includes identifying rows in the first table that do not contribute to the incremental modifications. The method also includes modifying the pre-computed aggregate table based only on information in the first table. The method also includes modifying the pre-computed aggregate table based only on information in the first table and the pre-computed aggregate table. The method includes analyzing the view definition including the type of aggregation functions and the nullability and data type of columns and expressions in the view definition to reduce or eliminate the use of information in base tables in order to define the incremental modifications to the pre-computed aggregate table.

In general, in another aspect, the present invention provides a method for maintaining pre-computed aggregate views. The method includes receiving a pre-computed aggregate view derived from one or more base tables. The pre-computed aggregate view includes a pre-computed aggregate table and a view definition. The view definition includes aggregation functions that can be any combination of sum, sum distinct, count(*), count distinct, min, and max. The view definition may include expressions that may be nullable. The method includes receiving changes to the base table. The changes may be non-minimal. The method includes defining a first table wherein each record shows, for each aggregation function, contributions from changes that are insertions and contributions from changes that are deletions. The method includes identifying, in the first table, each row representing an aggregated group that is not currently represented in the pre-computed aggregated table, that results from more changes that are insertions than changes that are deletions, and that does not require recomputation. The method includes modifying the pre-computed aggregate table with information from the identified rows.

In general, in another aspect, the present invention provides a method for maintaining pre-computed aggregate views. The method includes receiving a pre-computed aggregate view derived from one or more base tables. The pre-computed aggregate view includes a pre-computed aggregate table and a view definition. The pre-computed aggregate view is self-maintainable. The method includes receiving changes to the base table, the changes may be non-minimal. The method includes defining a first table wherein each record shows, for each aggregation function, contributions from changes that are insertions and contributions from changes that are deletions. The method includes identifying in the first table each row representing an aggregated group that is not currently represented in the pre-computed aggregate table and that results from more changes that are insertions than changes that are deletions. The method includes modifying the pre-computed aggregate table with information from the identified rows.

The invention can be implemented to realize one or more of the following advantages. A method in accordance with the invention allows a pre-computed aggregate view containing any combination of sum, count, min and max aggregation functions (including sum distinct, count(*) and count distinct) to be maintained incrementally even in the presence of non-minimal changes to a base table of the pre-computed aggregate view. The method correctly maintains pre-computed aggregate views involving nullable and/or non-nullable expressions in the view definition. A non-nullable column or expression is one that is guaranteed to not have null values. A nullable column or expression is one that may have null values. The method also handles multisets correctly. The method does not need preprocessing to reduce a set or sets of changes to a base table to become minimal. The changes are assumed to satisfy the property that the set of deleted rows is a subset of the combination of the set of original rows in the table and the inserted rows. In the method, changes computed and applied to the pre-computed aggregate table can be a set of inserted rows, a set of deleted rows, a set of updated rows, or a combination of these. This flexibility reduces the number of recomputations required to maintain a pre-computed aggregate view.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
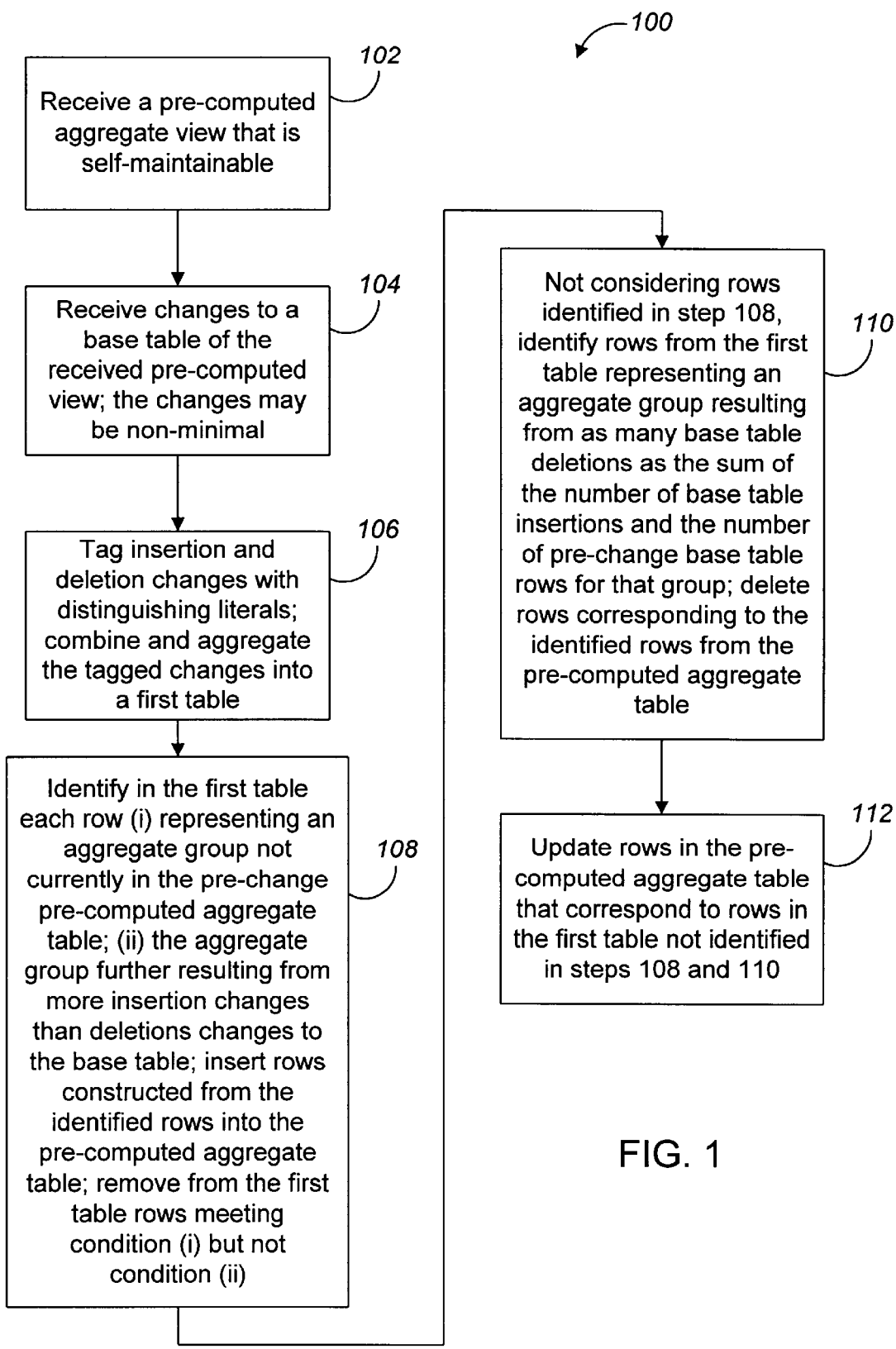
FIG. 1 shows a method in accordance with the invention for incrementally maintaining a pre-computed aggregate view that is self-maintainable.

FIGS. 1–4 show methods and implementations in accordance with the invention for maintaining pre-computed aggregate views in the presence of changes that may or may not satisfy weak or strong minimality. It is assumed that a pre-computed aggregate view is derived by aggregating the result of a set of one or more tables joined together using equi-join predicates. For example, the view definition query of such an aggregate may be of the following form:

SELECT $g_1, \ldots, g_m, a_1, \ldots, a_n$

FROM $R_1, R_2, \ldots, R_k$

WHERE $p_1 \wedge, \ldots, \wedge p_1$

GROUP BY $g_1, \ldots, g_m$

Where, in this example, $g_1, \ldots, g_m$ are grouping columns, $a_1, \ldots, a_n$ are aggregation expressions, $p_1 \wedge, \ldots, \wedge p_1$ are the join predicates, and $R_1, R_2, \ldots, R_k$ are tables that are joined and aggregated.

Terminology and Operations

A pre-computed aggregate view typically has an associated pre-computed aggregate table, which contains the materialized (computed) results of the view. The term V refers to a pre-computed view and $V_D$ and MV refer to a pre-computed view definition (i.e., query) and a result table in which the view is materialized (i.e., a pre-computed aggregate table), respectively. Maintenance or modification of a pre-computed view refers to maintenance or modification, respectively, of the pre-computed view's associated pre-computed table. It is assumed that a pre-computed aggregate table has a column that contains unique values. In one implementation, the column includes physical row identifiers. In another implementation, the column includes a primary key. It is assumed that such a column is called "rowid." The tables in the database can contain duplicates, as can the change sets.

The following description uses standard select, project, join, leftouterjoin, and generalized aggregation algebraic operators as well as insert, delete, and update operators. The generalized aggregation is essentially a group by operation that groups rows by sets of grouping columns and computes aggregation functions such as sum. The insert, delete, and update operations are side-effecting operators; i.e., they modify the input target table. They take as input a table to be modified (referred to as the target table) and a set of rows and modify the target table with the contents of the input rows. They may also output a result set. This output set is some subset of the input row set (with an appropriate set of projections). It is assumed that operators are duplicate preserving. The following is a list of operators.

1. Select is denoted by $\sigma_p(R)$, where p is the predicate used to filter rows in R.
2. Project is denoted by $\pi E_1, \ldots, E_1(R)$, where $E_1, \ldots, E_1$ are expressions constructed from columns of R. For simplicity, we'll often omit the details of projections and assume that every operator projects columns needed by the next operator (the consumer of its results).
3. Join is denoted by $R_1 \bowtie_p R_2$, where $R_1$ and $R_2$ are relations being joined and p is the join predicate.
4. Leftouterjoin is denoted by $R_1 \otimes_p R_2$ where $R_1$ is the relation whose rows are all preserved.
5. Generalized aggregation is denoted by g-agg$_{\{g_1,\ldots,g_m\}, \{a_1,\ldots,a_n\}}(R)$. This represents the result of grouping R by $g_1, \ldots g_m$, and computing the aggregations, $a_1, \ldots, a_n$. The allowable aggregation functions in the view definition are count(*), count, count distinct, sum, sum distinct, min and max.
6. The insert operator, denoted $I_{p,m}(T, R)$, takes as inputs a target table T (the table being modified) and an input rowset R and inserts contents of the input rows R into T. The parameter p denotes a predicate that causes only the rows in R that satisfy the predicate to be inserted into T. The insert operator produces a result set consisting of the remaining rows, i.e., rows that do not satisfy the predicate. There is no result set if there is no predicate specified. The second parameter m denotes a mapping of expressions constructed from (source) columns in the input R to (destination) columns in T.
7. The delete operator, denoted $D_{c,p}(T, R)$ takes as inputs a target table T (the table being modified), an input rowset R and deletes from T, the rows whose rowid is in the c column of R. The parameter p denotes a predicate which causes only the rows in R that satisfy the predicate to be deleted from T. The delete operator produces a result set consisting of all the rows from the input set.
8. The update operator, denoted $U_{c,p,m}(T, R)$ takes as inputs a target table T (the table being modified), an input rowset R and modifies the rows in T whose rowid is in the c column of R. Each row in T whose rowid matches the value of the c column in R is replaced by the matching row. The updated row may be given a new rowid. The parameter p denotes a predicate which causes only the rows in R that satisfy the predicate to be modified in T. The update operator produces a result set consisting of the remaining rows from the input set (none if there is no predicate specified). The third parameter m denotes a mapping of expressions constructed out of (source) columns in the input R to (destination) columns in T.

In one implementation, the methods use rowids of rows in the aggregate table (MV) to identify the rows that are to be deleted and updated, and are based on the assumption that a delete or update of a set of rows does not affect the rowids of the remaining rows. Alternatively, a method in accordance with the invention supports scenarios where a change to one row causes re-arrangement of the other rows. One mechanism for supporting such re-arrangement is to use a key column of the pre-computed aggregate table. Because the table contains the materialized result of a view with aggregation, the columns in the table corresponding to the grouping columns of the view definition generally constitute the primary key of the table. If a key does not exist, then the method employs additional joins to MV after each change to MV to determine the new rowids.

Three functions, null-add, null-sub, and null-comp, are defined as follows:

null-add(x, y)=case when isnull(x) then y
    when isnull(y) then x
    else x+y end null-sub(x,y)=case when isnull(x) then x
    when isnull(y) then x
    else x−y end null-comp(x, y, comp)=case when isnull (x) then y
    when isnull(y) then x
    else (case when y comp x then y else x end) end Note that the above expression follows Structured Query Language ("SQL") semantics. Note further that comp is any comparison operator such as <, <=, =, >, >=, and <>. Additionally, isnull(x) evaluates to TRUE if x is a NULL value and evaluates to FALSE otherwise (and vice versa for isnotnull(x)).

The $\stackrel{\scriptscriptstyle\Delta}{=}$ operator is similar to the regular equality=operator, except that two NULLs compare equal. According to SQL semantics A=B is not TRUE even if both A and B are NULL.

The $\stackrel{\scriptscriptstyle\Delta}{=}$ operator returns TRUE even if both A and B are NULL. A $\stackrel{\scriptscriptstyle\Delta}{=}$ B is equivalent to A=B$\lor$(isnull(A)$\land$isnull(B)).

The $\stackrel{\scriptscriptstyle\Delta}{=}$ operator, isnull and isnotnull predicates contribute to proper handling of nulls in accordance with SQL semantics.

Let $g_1, \ldots, g_m$ be grouping columns of $V_D$. Let $a_1, \ldots, a_n$ be the aggregation expressions. Let F be the table in the FROM clause of the view definition that is modified. Let $\delta^+F$ and $\delta^-F$ be the changes to F representing the inserted and deleted rows, respectively.

Let $\delta F$ be a table containing $\{\delta^+F\times\{x\}\}\uplus\{\delta^-F\times\{y\}\}$ where x and y are some arbitrary (but distinct) literals of the same type and $\uplus$ is duplicate preserving union and x is a (duplicate preserving) cross product. Essentially, $\delta F$ contains all the inserted and deleted rows, with an additional column to distinguish the inserted and deleted rows. The inserted and deleted rows could be tagged with the distinguishing literals while they are produced instead of requiring a separate step to tag them. Let f denote this additional column.

Self-Maintainable Views

Let V be a pre-computed aggregate view whose definition $V_D$ contains either a count(*) aggregation function and/or aggregation expressions of the form count(expr) where expr is non-nullable. In addition, $V_D$ may contain aggregation functions sum(expr) where expr is, again, non-nullable and the datatype of expr is not FLOAT and $V_D$ may also contain count(expr) aggregation functions where expr is nullable. In other words, the input to any sum aggregation function must not be nullable or a float datatype and there must be either a count(*) or count of a non-nullable expression and the view cannot have sum distinct, count distinct, min or max aggregation functions. Such a view is self-maintainable under deletes and inserts because the changes can be calculated without accessing the tables that it is derived from.

If the changes to the detail table do not involve any deletes (or updates) then the view is self-maintainable if there are no sum distinct or count distinct aggregation functions.

FIG. 1 shows one method 100 in accordance with the invention for incrementally maintaining a pre-computed aggregate view in the presence of non-minimal changes. A system receives the pre-computed aggregate view V (step 102). The pre-computed aggregate view is self-maintainable. The pre-computed aggregate view includes a pre-computed aggregate table and the view definition $V_D$. The system receives changes to a base table of the pre-computed view (step 104). The changes can be non-minimal and are represented as insertions and deletions. Optionally, if the changes are not represented as insertions and deletions, then the system represents the changes as insertions and deletions.

The system tags insertions and deletions with distinguishing literals, combines the tagged insertions and deletions, and aggregates the combined tagged insertions and deletions to produce a first table (step 106). The first table may include rows that correspond to rows in the pre-computed aggregate table. Corresponding rows refers to those having matching values for grouping columns.

The system identifies in the first table each row satisfying two conditions, conditions (i) and (ii), and inserts information from the identified rows into the pre-computed aggregate table (step 108). To satisfy condition (i), a row must represent an aggregated group not currently represented in the pre-computed aggregate table. To satisfy the condition (ii), a row must represent an aggregated group resulting from more changes that are insertions than changes that are deletions. Note that in taking information from the identified rows to keep the pre-computed aggregate table in synch, the system does not need to refer to the base tables. That is, the system does not need to recompute changes corresponding to the identified rows. The system removes from the first table rows that satisfy condition (i) but fail to satisfy condition (ii) (also step 108).

The system identifies in the first table rows satisfying the following condition and deletes from the pre-computed aggregate table rows that correspond to the identified rows (step 110). The condition is that a row must represent an aggregated group that results from as many base table deletions as the sum of the number of base table insertions and the number of pre-change base table rows for that aggregated group as stored in the pre-computed aggregate table. (The pre-change base table is the base table as it existed before the received changes are implemented.) In identifying rows satisfying this condition (i.e., performing step 110), the system does not consider rows identified in step 108.

The system updates rows in the pre-computed aggregate table corresponding to rows in the first table (step 112). In making these modifications, the system does not consider rows previously identified in steps 108 and 110. At this point, the pre-computed aggregate table is in synch with the changed base table.

Alternatively, the system performs all the identification and then designates the identified rows for later modification (which can include any combination of insert, delete, and update operations).

Figure 2:
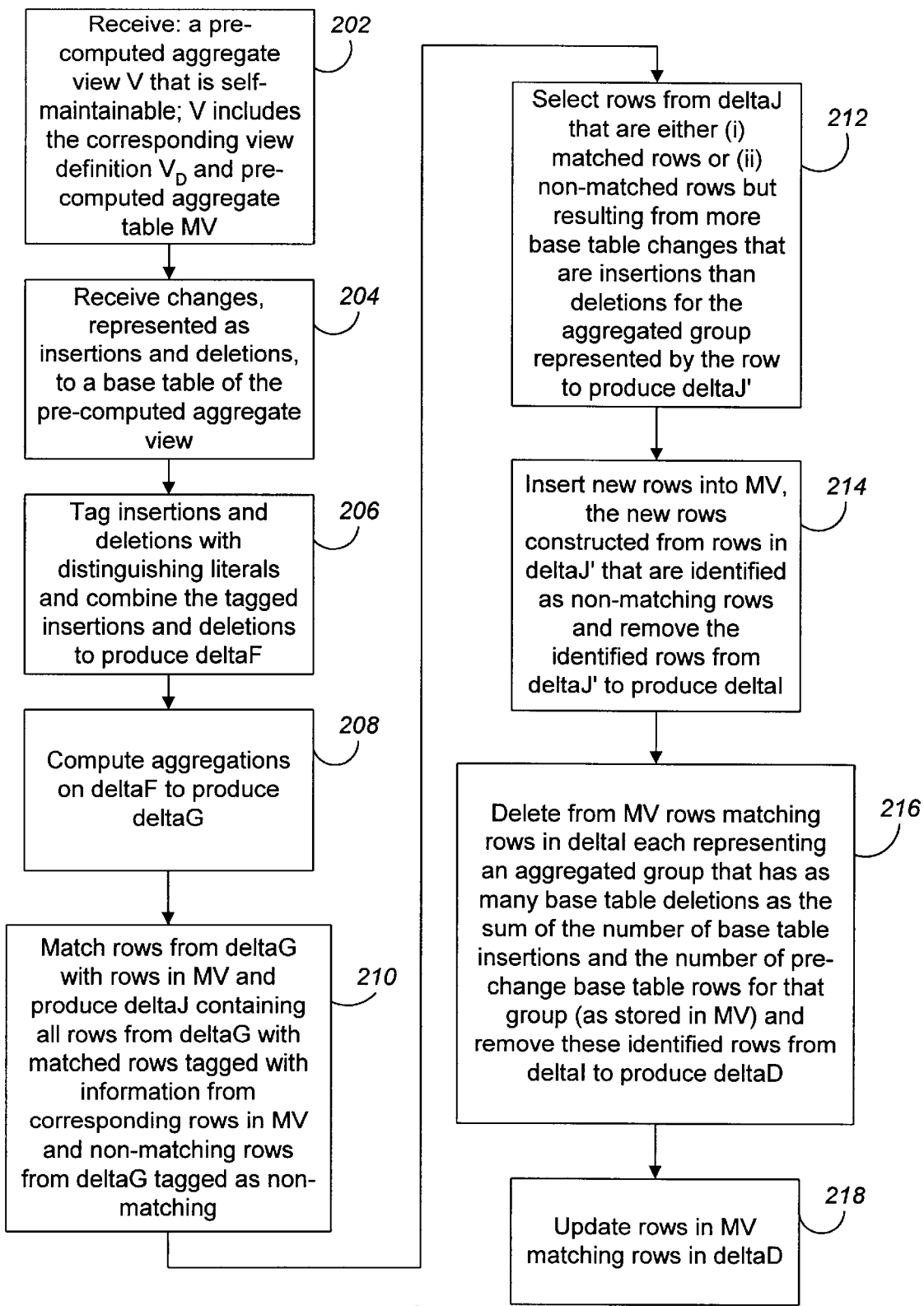
FIG. 2 shows another method in accordance with the invention for incrementally maintaining a pre-computed aggregate view that is self-maintainable.

FIG. 2 shows another method in accordance with the invention for incrementally maintaining a pre-computed aggregate view that is self-maintainable. The system receives the pre-computed aggregate view V that is self-maintainable, including its view definition $V_D$ and materialized aggregate table MV (step 202). The system also receives changes to a base table of the pre-computed aggregate view, the changes being represented as deletions and insertions (step 204). The system tags insertions and deletions with distinguishing literals and combines them to produce δF (deltaF) (step 206). The system computes aggregations on δF to produce aggregated change set δG (deltaG) (step 208). The system matches rows from δG with rows in MV and produces δJ (deltaJ), which contains all rows from δG with matched rows tagged with information from corresponding rows in MV and further contains non-matching rows from δG tagged as non-matching (step 210). (Matched rows are rows that have corresponding rows and non-matching rows are rows that do not have corresponding rows.) One way to tag rows in δJ as non-matching is to insert NULL values in MV columns. The system produces δJ' (deltaJ') by selecting from δJ rows identified as either: (i) matched rows or (ii) identified as non-matching but resulting from more base table changes that are insertions than deletions for the aggregated group represented by the row (step 212). The system inserts new rows into MV, the new rows being constructed from rows (in δJ') identified as non-matching rows (step 214). The system removes the identified rows from δJ' to produce δI (deltaI) (also step 214). The system deletes from MV rows matching rows in δI, each row representing an aggregated group that has as many base table deletions as the sum of the number of base table insertions and the number of pre-modified base table rows for that group as stored in MV (step 216). The system removes these identified rows from δI to produce δD (deltaD) (also step 216). The system updates rows in MV matching rows in δD (step 218).

The following describes in detail the method shown in FIG. 2 for incrementally maintaining a pre-computed aggregate view in the presence of non-minimal changes.

1. δG is computed as follows: Let $V'_D$ be obtained by modifying $V_D$ by replacing F in $V_D$ with δF and replacing each aggregation expression $a_i$ with three functions $a_i^+$, $a_i^-$, and $a_i^d$ defined as follows:

(a) if $a_i$ is count, then $a_i^+$ is count(case when f=x then z else NULL end), and $a_i^-$ is count(case when f=y then z else NULL end) where z is expr if the aggregation expression is count(expr) and is some non-null literal, otherwise (i.e., if it is count(*)).

(b) if $a_i$ is sum(expr), then $a_i^+$ is sum(case when f=x then expr else NULL end), and $a_i^-$ is sum(case when f=y then expr else NULL end).

(c) ad is defined as follows:
$a_i^d = a_i^+ - a_i^-$, if $a_i$ is count
=case when isnull($a_i^-$) then $a_i^+$
   when isnull($a_i^-$) then $a_i^+$
   else $a_i^+ - a_i^-$ end, if $a_i$ is sum.

Note that $a_i^+$ represents contributions from changes that are insertions and $a_i^-$ represents contribution from changes that are deletions. Note further that the use of conditional case expressions inside aggregation functions (e.g., such as the use described in (a)–(b) above) requires the addition of only one column to the original set of insertions and deletions in the construction of δF. The technique described in the previous two notes also apply to the method (described in the next section) for maintaining either pre-computed aggregate views that are self-maintainable or pre-computed aggregate views that are not self-maintainable. δG is computed as $V'_D$ (δF).

2. δJ is computed as $δG ⊗_p MV$ where the outerjoin condition, p, is:

$δF.g_1 \triangleq MV.g_1 \wedge, \ldots, \wedge δF.g_m \triangleq MV.g_m$.

The $\triangleq$ operator may be replaced by a regular equality= operator for each grouping column $g_i$ that is not nullable (guaranteed to not have null values).

3. Let c denote one of the count(*) or count( ) expressions and let $c^+$ and $c^-$ denote the corresponding $a_i^+$ and $a_i^-$ expressions described in 1(a) and 1(b) above. $\delta J'$ is computed as $\sigma_p(\delta J)$ where p is (isnotnull(MV.rowid))∨($c^+$>$c^-$) and MV.rowid is the rowid (which can actually be any non-nullable) column of MV (in the input $\delta J$).

4. $\delta I$ is computed as $I_{p,m}(MV, \delta J')$ where p is isnull (MV.rowid) and the mapping m of expressions from source columns of $J\delta'$ to columns of the target of the insert, MV is as follows: Each grouping column from the $\delta G$ component of $\delta J'$ maps to the corresponding grouping column in MV. For each aggregation column $a_i$ in $V_D$, the corresponding $a_i^d$ column (from the $\delta G$ component) of $\delta J'$ maps to the corresponding aggregation column in MV. Note that the reference to MV.rowid in the predicate p is to the MV.rowid column in the input $\delta J'$.

5. $\delta D$ is computed as $D_{MV.rowid,p}(MV, \delta I)$ where p is $c^-$=MV.c+$c^+$.

6. $\delta U$ is computed as $U_{MV.rowid,TRUE,m}(MV.\delta D)$ where the mapping m of source expressions to target columns is as follows:

Each grouping column $g_i$ in $\delta D$ maps to the corresponding grouping column in MV. For each aggregation column $a_i$ in $V_D$, the corresponding $u_{a_i}$, as defined below, maps to the corresponding aggregation column $a_i$ in MV.

$u_{a_i}$ is as follows:
$u_{a_i}$=MV.$a_i$+$a_i^+$−$a_i^-$, if $a_i$ is count(expr) or count (*)
=null-sub(null-add(MV.$a_i$,$a_i^+$),$a_i^-$) if $a_i$ is sum(expr)

The previous delete can be modified so that the deleted rows are not in the delete's result set. However, because they are deleted anyway, they are irrelevant for the next update operation.

Views That are not Self-Maintainable

Let V be a pre-computed aggregate view that is not self-maintainable. That is, view V does not satisfy the conditions previously defined for a self-maintainable view. A method in accordance with the invention for maintaining such a view is described below. It is assumed that the changes have already been applied to F, but the method can be easily altered to deal with the pre-modified state of F. This method does not require a view definition to include any type of counts, including count(*) or count(expr). Although this method is described in terms of maintaining views that are not self-maintainable, the method is capable of maintaining either self-maintainable views or views that are not self-maintainable.

Figure 3:
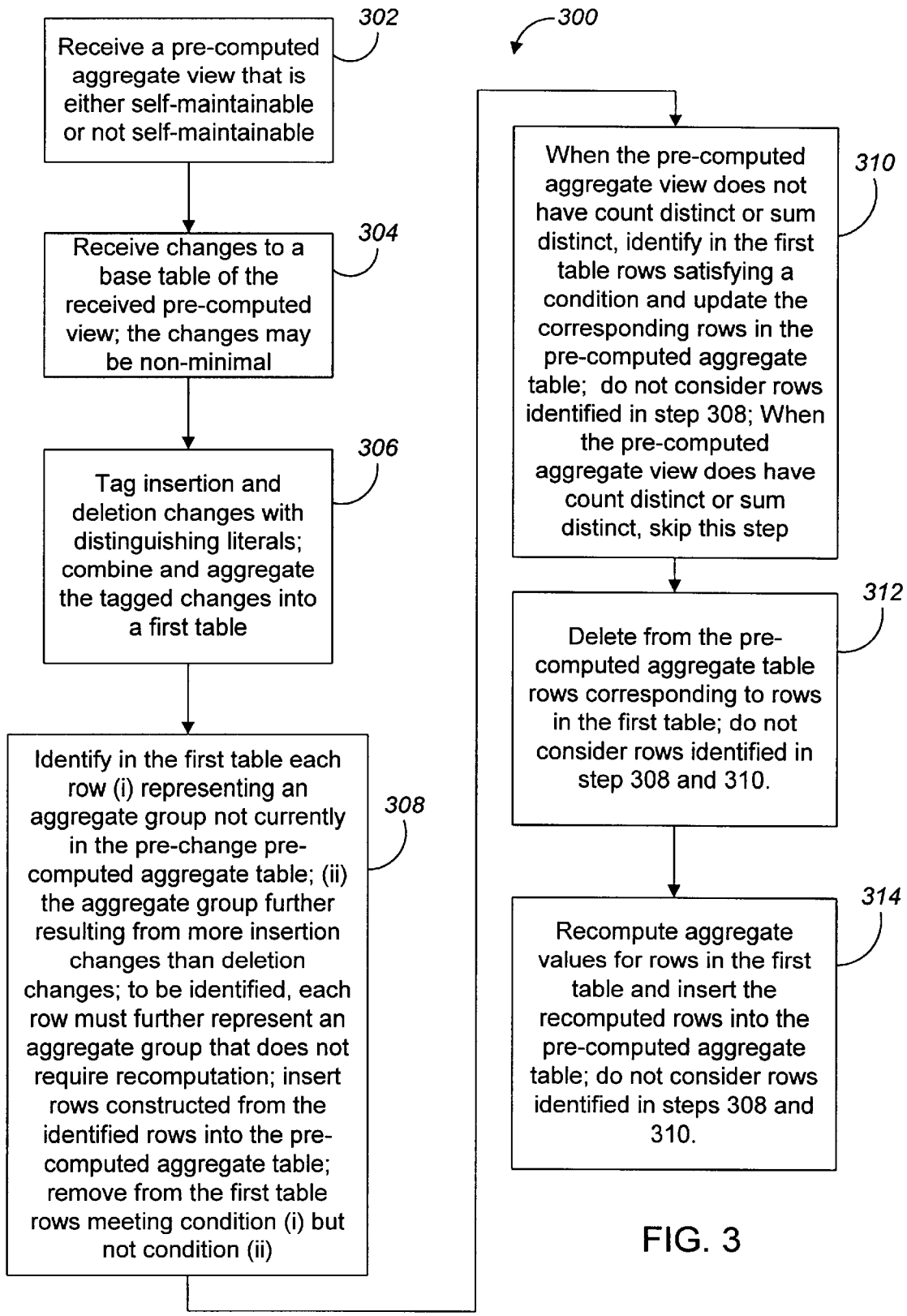
FIG. 3 shows a method in accordance with the invention for incrementally maintaining either a pre-computed aggregate view that is self-maintainable or a pre-computed aggregate view that is not self-maintainable.

FIG. 3 shows a method 300 in accordance with the invention for incrementally maintaining a pre-computed aggregate view that is not self-maintainable. The system receives a pre-computed aggregate view (step 302). The pre-computed aggregate view includes a pre-computed aggregate table and a view definition. The view definition can include any combination of sum, count, min and max aggregation functions, including sum distinct, count(*) and count distinct.

The system receives changes to a base table of the pre-computed view (step 304). The changes can be non-minimal and are represented as insertions and deletions. Optionally, if the changes are not represented as insertions and deletions, then the system represents the changes as insertions and deletions.

The system tags insertions and deletions with distinguishing literals, combines the tagged insertions and deletions, and aggregates the combined tagged insertions and deletions to produce a first table (step 306). The first table may include rows that correspond to rows in the pre-computed aggregate table. (Corresponding rows are those having matching values for grouping columns.)

The system identifies in the first table each row satisfying the three conditions, condition (i), condition (ii), and condition (iii), and inserts information from the identified rows into the pre-computed aggregate table (step 308). To satisfy condition (i), a row must represent an aggregated group not currently represented in the pre-computed aggregate table. To satisfy condition (ii), a row must represent an aggregated group resulting from more changes that are insertions than changes that are deletions. To satisfy condition (iii), a row must represent an aggregate group that does not require recomputation. The system removes from the first table rows meeting condition (i) but not condition (ii) (also step 308).

When there are no count distinct or sum distinct, the system identifies rows satisfying two conditions, conditions (iv) and (v), and updates the corresponding rows in the pre-computed aggregate table (step 310). To satisfy condition (iv), a row must have a corresponding row in the pre-computed aggregate table. To satisfy condition (v), the row must represent an aggregate group that does not require recomputation or deletion. The system does not consider rows identified in step 308.

When there is a count distinct or a sum distinct, the system skips step 310. The system identifies in the first table rows having corresponding rows in the pre-computed aggregate table and deletes the corresponding rows from the pre-computed aggregate table (step 312). The system does not consider rows identified in steps 308 and 310.

The system recomputes aggregate values for rows in the first table (step 314). The system does not consider rows identified in steps 308 and 310. The system inserts the recomputed rows into the pre-computed aggregate table (also step 314).

Figure 4A:
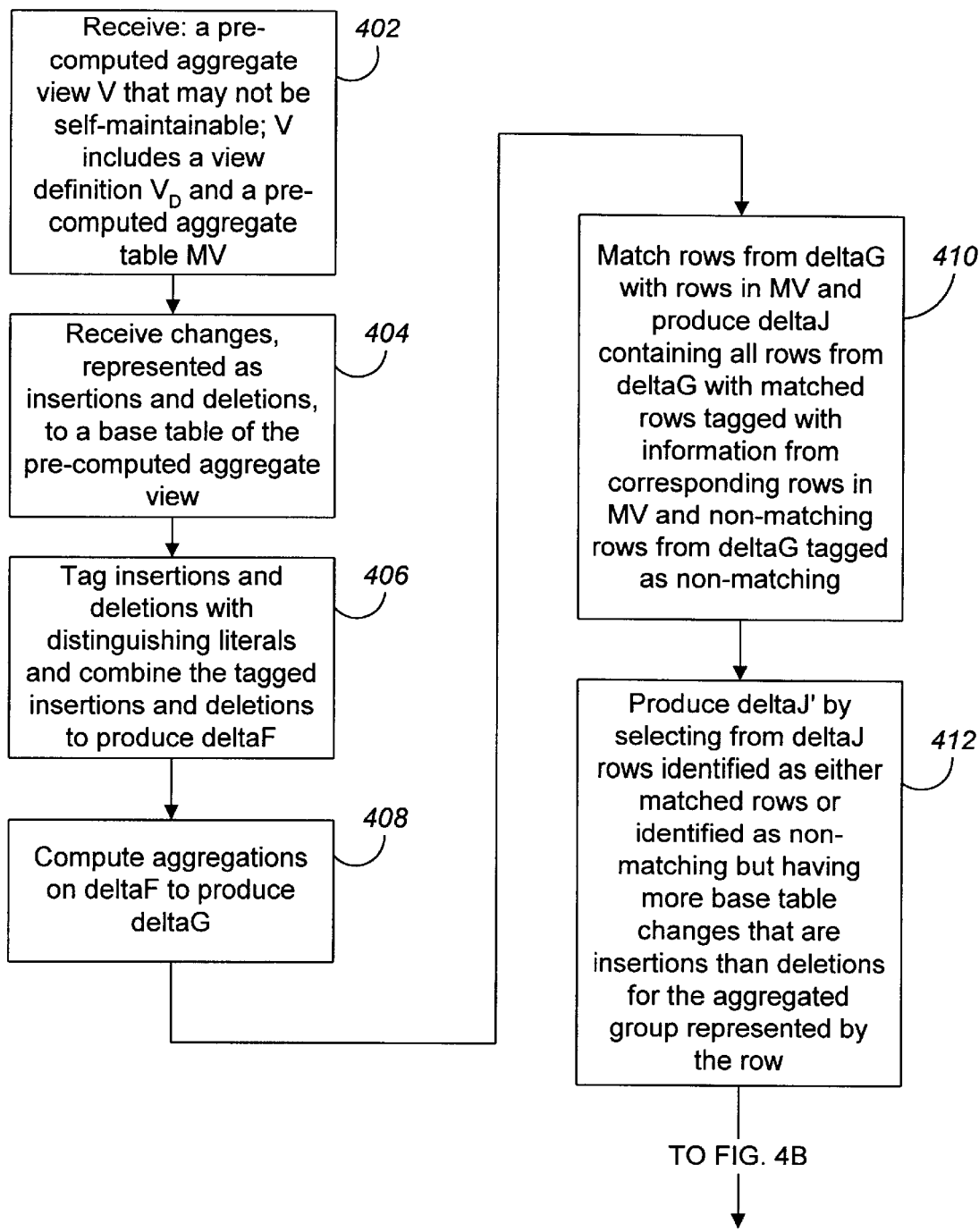
FIG. 4 (made of 4A and 4B) shows another method in accordance with the invention for incrementally maintaining either a pre-computed aggregate view that is self-maintainable or a pre-computed aggregate view that is not self-maintainable.

FIG. 4 shows another method in accordance with the invention for incrementally maintaining a pre-computed aggregate view that may not be self-maintainable. The system receives the pre-computed aggregate view V, which is not self-maintainable, including its view definition $V_D$, and pre-computed aggregate table MV (step 402). The system also receives changes to a base table of the pre-computed aggregate view, the changes being represented as deletions and insertions (step 404). The system tags insertions and deletions with distinguishing literals and combines them to produce $\delta F$ (step 406). The system computes aggregations on $\delta F$ to produce aggregated change set $\delta G$, including counts of deleted and inserted rows for each aggregation group (step 408). The system matches rows from $\delta G$ with rows in MV and produces $\delta J$, which contains all rows from $\delta G$ with matched rows tagged with information from corresponding rows in MV and further contains non-matching rows from $\delta G$ tagged as non-matching (step 410). (Matching rows are rows that have corresponding rows and non-matching rows are rows that do not have corresponding rows.) One way to tag rows in $\delta J$ as non-matching is to insert NULL values in MV columns. The system produces $\delta J'$ by selecting from $\delta J$ rows identified as either matched rows or identified as non-matching but having more base table changes that are insertions than deletions for the aggregated group represented by the row (step 412). The system inserts new rows into MV, the new rows being constructed from rows in $\delta J'$ identified as non-matching rows and not requiring re-computation of aggregation values from detail data (step 414). The system removes the identified rows from $\delta J'$ to produce $\delta I$ (also step 414). If the view V contains sum distinct or count distinct (YES to decision 416), the system sets $\delta U$ to $\delta I$ (step 418) and skips step 420. Otherwise (NO to decision 418), the system identifies and updates rows in MV that (i) match rows (in δI), (ii) do not require deletion, and (iii) whose new aggregation values can be determined from the corresponding values in δI (step 420). The system removes from δI rows corresponding to the identified rows to produce δU (also step 420). The system deletes rows in MV matching rows in δU and produces δD containing all of δU (step 422). The system joins D to the post-change base tables and aggregates and inserts rows constructed from the aggregated result into MV (step 424).

The following describes in detail the method shown in FIG. 4 for incrementally maintaining a pre-computed aggregate view that is not self-maintainable in the presence of non-minimal changes. Although this method is described in terms of maintaining pre-computed views that are not self-maintainable, the method is capable of maintaining both pre-computed views that are self-maintainable as well as pre-computed views that are not self-maintainable.

1. δG is computed as follows: Let $V'_D$ be obtained by replacing F in $V_D$ with δF and replacing each aggregation expression $a_i$ with three functions $a_i^+$, $a_i^-$, and $a_i^d$ defined as follows:

if $a_i$ is count, then $a_i^+$ is count(case when f=x then z else NULL end), and $a_i^-$ is count(case when f=y then z else NULL end) where z is expr if the aggregation expression is count(expr) and is some non-null literal, otherwise.

(b) if $a_i$ is sum(expr), then $a_i^+$ is sum(case when f=x then expr else NULL end), and $a_i^-$ is sum(case when f=y then expr else NULL end).

(c) if $a_i$ is min(expr), then $a_i^+$ is min(case when f=x then expr else NULL end), and $a_i^-$ is min(case when f=y then expr else NULL end).

(d) if $a_i$ is max(expr), then $a_i^+$ is max(case when f=x then expr else NULL end), and $a_i^-$ is max(case when f=y then expr else NULL end).

(e) $a_i^d$ is defined as follows:

$$a_i^d = a_i^+ - a_i^-, \text{ if } a_i \text{ is count,}$$
$$= \text{case when } isnull(a_i^+) \text{ then } a_i^+ \text{ when } isnull(a_i^-) \text{ then}$$
$$\quad a_i^+ \text{ else } a_i^+ - a_i^- \text{ end, if } a_i \text{ is sum}$$
$$= a_i^+, \text{ if } a_i \text{ is max or min}$$

If $a_i$ is a distinct aggregate (count distinct or sum distinct), then the system constructs the expressions as in (a) or (b) but with the distinct specified in the aggregation expression. If $V_D$ contains sum distinct or count distinct then existing groups in MV that are affected by the changes need to be recomputed (unless they are to be deleted entirely) and for new groups that do not already exist in MV, recomputation is not necessary only when the delete set is empty. This notion is further described below.

Let c denote one of the count(*) or count( ) expressions and let $c^+$ and $c^-$ denote the corresponding $a_i^+$ and $a_i^-$ expressions described in 1(a) and 1(b) above. If $V_D$ does not contain such an expression, then add $c^+$ and $c^-$ corresponding to a count(*) expression. In other words, δG will contain such a pair even though $V_D$ does not contain such an expression. δG is computed as $V'_D$(δF).

2. δJ is computed as $\delta G \otimes_p MV$ where the outerjoin condition p is $\delta F.g_1 \underline{=} MV.g_1 \wedge, \ldots, \wedge \delta F.g_m \underline{=} MV.g_m$.

The $\underline{=}$ operator may be replaced by a regular equality= operator for each column $g_i$ that is not nullable (guaranteed to not have null values).

3. δJ' is computed as $\sigma_p(\delta J)$ where p is (isnotnull(MV.rowid))$\vee$($c^+$>$c^-$) and MV.rowid is the rowid (could actually be any non-nullable) column of MV.

4. δI is computed as $I_{p,m}(MV, \delta J')$ where p is isnull(MV.rowid)$\wedge p_{nr}$ and $p_{nr}$ is as follows:

If one of the $a_i$ in $V_D$'s select list is sum(expr) where expr is a FLOAT column or is sum(distinct expr) or is count (distinct expr), then $p_{nr}$ is $c^-$=0. Otherwise $p_{nr}$ is $c^-$=0$\vee$ $(p_{nr_1} \wedge \ldots \wedge p_{nr_n})$ where each $p_{nr_i}$ is a predicate corresponding to the aggregation function $a_i$ in $V_D$ as follows:

If $a_i$ either count(*) or count(expr), then $p_{nr_i}$ is TRUE. If $a_i$ is sum(expr) and expr is non-nullable, then $p_{nr_i}$ is TRUE. If $a_i$, is sum(expr) of nullable column then $p_{nr_i}$ is isnull($a_i^-$)$\vee a_i^+$<>$a_i^-$. If $a_i$ is min(expr) then $p_{nr_i}$ is isnull($a_i^-$)$\vee a_i^+$<$a_i^-$. If $a_i$ is max(expr) then $p_{nr_i}$ is isnull($a_i^-$)$\vee a_i^+$>$a_i^-$.

The mapping m of expressions from source columns of δJ' to columns of the target of the insert, MV is as follows: Each grouping column from the δG component of δJ' maps to the corresponding grouping column in MV. For each aggregation column $a_i$ in $V_D$, the corresponding $a_i^d$ column (from the δG component) of δJ' maps to the corresponding aggregation column in MV.

5. If at least one of the $a_i$'s is count(distinct expr) or sum(distinct expr), then δU=δI (i.e., we skip this step), else $\delta U = U_{MV.rowid,p,m}(MV, \delta I)$ where p and m are as follows: Let p' be $c^-$=0. If at least one of the $a_i$'s is sum(expr) where expr is a FLOAT column, then p is p'$\wedge$isnotnull(MV.rowid). Otherwise, p is (p'$\vee$($p_1 \wedge, \ldots, \wedge p_n$))$\wedge$isnotnull(MV.rowid) where each $p_i$ corresponds to aggregate expression $a_i$ in $V_D$ and is as follows:

If $a_i$ is count(expr) or count(*) then $p_i$ is $MV.a_i + a_i^+ - a_i^- > 0$

If $a_i$ is sum(expr) then $p_i$ is
(case when isnull(MV.$a_i$) then 0 else MV.$a_i$ end)
+(case when isnull($a_i^+$) then 0 else $a_i^+$end)
−(case when isnull($a_i^-$) then 0 else $a_i^-$end))<>0

If $a_i$ is min(expr) then $p_i$ is
(($a_i^+ < a_i^-$)$\vee$(MV.$a_i < a_i^-$)$\vee$(isnull($a_i^-$)))$\wedge$ ((isnotnull($a_i^+$))$\vee$(isnotnull(MV.$a_i$)))

If $a_i$ is max(expr) then $p_i$ is
(($a_i^+ > a_i^-$)$\vee$(MV.$a_i > a_i^-$)$\vee$(isnull($a_i^-$)))$\wedge$ ((isnotnull($a_i^+$))$\vee$(isnotnull(MV.$a_i$)))

The mapping m of source expressions to target columns is as described by the following. Each grouping column $g_i$ in δI maps to the corresponding grouping column in MV. For each aggregation column $a_i$ in $V_D$, the corresponding $u_{a_i}$, as defined below, maps to the corresponding aggregation column $a_i$ in MV.

$u_{a_i}$ is defined as follows:

$$u_{a_i} = MV \cdot a_i + a_i^+ - a_i^-, \text{ if } a_i \text{ is count}(expr) \text{ or count}(*)$$
$$= null - sub(null - \text{add}(MV \cdot a_i, a_i^+), a_i^-) \text{ if } a_i \text{ is sum}(expr),$$
$$= null - comp(MV \cdot a_i, a_i^+, <) \text{ if } a_i \text{ is min}(expr),$$
$$= null - comp(MV \cdot a_i, a_i^+, >) \text{ if } a_i \text{ is max}(expr)$$

The mapping defines how MV is updated using values from δI. At this stage, all groups whose aggregation values can be determined solely from the changed rows and old aggregation values in the pre-computed aggregate table are inserted and updated. The next set of operators (explained below), recompute aggregation values for the remaining groups and delete and reinsert them. Note that the deletions do not apply to rows not having corresponding ones in the pre-computed aggregate table. As discussed, $a_i^+$ represents contributions from changes that are insertions and $a_i^-$ represents contribution from changes that are deletions. Being able to distinguish contributions from changes that are insertions and contributions from changes that are deletions reduces the number of necessary recomputations. For example, given a precomputed aggregate view that contains min(expr) and the min for changes that are deletions for an aggregation group is the same as the min for that same group in the pre-computed aggregate table. Recomputation is not necessary if the min for the changes that are insertions for that same aggregation group is less than the min for that group in the pre-computed aggregate table.

6. $\delta D$ is computed as $D_{MV.rowid,TRUE}$ (MV, $\delta U$).

7. Let R' represent the result of evaluating all the joins as specified in the view definition $V_D$. $\delta F'$ is computed as $\delta D \bowtie_p R'$ where p is $\pi_{R'}.(\delta D.g_1 \underline{N} R'.g_1 \wedge, \ldots, \wedge \delta D.g_m \underline{N} R'.g_m)$.

8. $\delta R''$ is computed as $g\text{-agg}_{\{g1, \ldots, gn\},\{a_1, \ldots, a_n\}}(\delta F')$.

9. Finally $\delta I'$ is computed as $I_{TRUE,m}(MV, \delta R'')$ where m maps the columns of $\delta R''$ to their respective columns in MV.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the following claims. For example, steps of the invention can be performed in a different order and still achieve desirable results. The following section describes some alternative methods that further reduce the cases when groups are recomputed from detail data.

In one alternative method, it is possible to avoid re-computing groups when the view has a sum(expr) aggregation expression where expr is nullable if the view also has a count(*) (or count(expr1) where expr1 is not nullable) and count(expr) where expr is the same expression that is the input to the sum aggregation. When the changes to the detail table involves a set of deletes (and possibly inserts), the new value for sum(expr) cannot simply be determined by subtracting sum(expr) of the deleted rows from the old sum (and adding sum(expr) of the inserted rows). This is because, if the set of rows in a group has 0's and NULLs, the resulting sum may be NULL (if all the rows with 0's are deleted). However, if the view contains count(expr), it is possible to determine the new value for sum by looking at the difference between count(expr) for the changed rows and the old count(expr) value. If the sum of the old count(expr) value and count(expr) for the inserted rows minus the count (expr) for the deleted rows is zero then the new sum must be NULL. Note that count(*) is required to determine if a row in MV should be deleted based on whether or not all the rows represented by that group have been deleted. For example, removal is appropriate when all the rows in the group have been deleted. A view that has a count(expr) for each sum(expr) and also a count(*) (or count(not nullable expr)) is self-maintainable, assuming that there are not any sum distinct, or count distinct, min, max or sum(float expression) aggregations. The conditional update predicate is modified as explained above.

In another alternative method, the method previously described for views that are not self-maintainable is modified to avoid recomputations as follows:

(a) In the previously described method, it is possible to avoid recomputing groups simply to determine if all the rows in the group have been deleted by utilizing count(*) or count(non-nullable expr) if either one exists. The group may still require recomputation to determine new values for other aggregation columns. As an example, suppose that all the rows in a group have NULLs for a column and a subset of these rows is deleted. It is possible to determine if the group should be deleted or retained by comparing the count(*) value in the (old version of the) aggregate table and the count(*)s for the deleted and inserted sets as described in the algorithm for self-maintainable views. In this alternative method, the conditional update predicate in step 5 is modified to include this feature.

(b) The technique for reducing recomputation described for views with sum(expr) where expr is nullable can also be applied to views that are not self-maintainable. In this alternative method, a group will not have to be recomputed for the purpose of determining whether the new sum should be NULL or 0. There might be other reasons for recomputing group (for example, if the view has a min aggregation and we need to determine the new value because rows with the old min were deleted).

(c) It is also possible to minimize recomputations in the case of distinct aggregates. In the case of sum distinct, if the aggregated value for both the deleted and the inserted sets is NULL, then it may not be necessary to recompute the group. Similarly, in the case of count distinct, if the count is 0 for both the deleted set and for the inserted set, then it may not be necessary to recompute the group. In this alternative method, the conditional predicates are modified to incorporate this technique.

(d) This alternative method also supports view definitions that have additional predicates (in addition to the equi-join predicates). In all the steps where the equi-joins specified in the where clause are evaluated, one would add these additional predicates.

(e) This alternative method also includes a technique that is based on leveraging foreign-key/primary-key relationships. For example, if the FROM clause of the view definition contains two tables F and D, where F has a foreign-key referencing the primary-key column of D, then if D is changed by only inserting rows or by only deleting rows that are guaranteed to not violate the referential relationship, then this view will not have to be maintained.

What is claimed is:

1. A computer-implemented method for maintaining pre-computed aggregate views, comprising:

(A) receiving a pre-computed aggregate view V derived from one or more base tables, the pre-computed aggregate view V including a pre-computed aggregate table MV and a view definition $V_D$, wherein $g_1, \ldots, g_m$ are grouping columns of $V_D$, and $a_1, \ldots, a_n$ are aggregation expressions;

(B) receiving changes to the one or more base tables, the changes being non-minimal;

(C) defining result set $\delta F$ as $\{\delta^+F \times \{x\}\} \uplus \{\delta^-F \times \{y\}\}$, where x and y are some arbitrary but distinct literals of the same type, $\uplus$ is duplicate preserving union, and $\times$ is a duplicate preserving cross product, wherein F is a table in a FROM clause of the view definition $V_D$ and $\delta^+F$ and $\delta^-F$ are changes to F representing inserted and deleted rows, respectively, of the received changes, and wherein result set $\delta F$ contains all the inserted and deleted rows, with an additional column to distinguish the inserted and deleted rows;

(D) defining result set $\delta G$ as $V'_D(\delta F)$, wherein $V'_D$ is obtained by modifying $V_D$ by replacing F in $V_D$ with $\delta F$ and replacing each aggregation expression $a_i$ in $V_D$, with three functions $a^+_i, a^-_i$, and $a^d_i$ defined as follows:

(i) if $a_i$ is count, then $a^+_i$ is count(case when f=x then z else NULL end), and $a^-_i$ is count(case when f=y then z else NULL end) where z is expr if the aggregation expression is count(expr) and is some non-null literal, otherwise (i.e., if it is count(*)), (ii) if $a_i$ is sum(expr), then $a^+_i$ is sum(case when f=x then expr else NULL end), and $a^-_i$ is sum(case when f=y then expr else NULL end), (iii) $a^d_i$ is defined as follows:
$a^d_i = a^+_i - a^-_i$, if $a_i$ is count
= case when isnull($a^-_i$) then $a^+_i$
when isnull($a^-_i$) then $a^+_i$
else $a^+_i - a^-_i$ end, if a is sum, wherein $a^+_i$ represents contributions from changes that are insertions and $a^-_i$ represents contribution from changes that are deletions;

(E) defining result set $\delta J$ as $\delta G \otimes_p MV$, wherein the outer-join condition, p, is:

$\delta F.g_1^N = MV.g_1 \wedge, \ldots, \wedge \delta F.g_m^N = MV.g_m$, and wherein the=operator is optionally replaced by a regular equality=operator for each grouping column g, that is not nullable;

(F) defining result set $\delta J'$ as $\sigma_p(\delta J)$, wherein p is (isnotnull(MV.rowid))$\vee$($c^+ > c^-$) and MV.rowid is the rowid, which can be any non-nullable column of MV in the result set $\delta J$, and wherein c denotes one of the count(*) or count( ) expressions and $c^+$ and $c^-$ denote the corresponding $a^+_i$ and $a^-_i$ expressions described in (D)(i) and (D)(ii);

(G) defining result set $\delta I$ as $I_{p,m}(MV, \delta J')$, wherein p is isnull(MV.rowid) and a mapping m of expressions from source columns of $\delta J'$ to columns of a target of the insert, MV is as follows: each grouping column from the $\delta G$ component of $\delta J'$ maps to the corresponding grouping column in MV, wherein for each aggregation expression $a_i$ in $V_D$, a corresponding $a^d_i$ column from a $\delta G$ component of $\delta J'$ maps to a corresponding aggregation column in MV, and wherein the reference to MV.rowid in the predicate p is to the MV.rowid column in the input $\delta J'$;

(H) defining result set $\delta D$ as $D_{MV.rowid,p}(MV, \delta I)$ wherein p is $c^- = MV.c + c^+$; and (I) defining result set $\delta U$ as $U_{MV.rowid,TRUE,m}(MV, \delta D)$, wherein a mapping m of source expressions to target columns is as follows: each grouping column $g_i$ in $\delta D$ maps to a corresponding grouping column in MV, and for each aggregation expression $a_i$ in $V_D$, a corresponding $u_{ai}$, maps to a corresponding aggregation column $a_i$ in MV, and wherein $u_{ai}$ is as follows:
$u_{ai} = MV.a_i + a^+_i - a^-_i$, if $a_i$ is count(expr) or count(*),
$u_{ai}$ = null-sub(null-add(MV.$a_i, a^+_i$), $a^-_i$) if $a_i$ is sum(expr).

2. A computer implemented method for maintaining pre-computed aggregate views, comprising:

(A) receiving a pre-computed aggregate view V derived from one or more base tables, the pre-computed aggregate view V including a pre-computed aggregate table MV and a view definition $V_D$, the view definition $V_D$ including aggregation functions that can be any combination of sum, sum distinct, count(*), count distinct, min, and max, the view definition further including expressions that may be nullable, wherein $g_1, \ldots, g_m$ are grouping columns of $V_D$, and $a_1, \ldots, a_n$ are aggregation expressions;

(B) receiving changes to the one or more base tables, the changes being represented as insertions and deletions and being non-minimal;

(C) defining result set $\delta F$ as $\{\delta^+F \times \{x\}\} \uplus \{\delta^-F \times \{y\}\}$, wherein x and y are some arbitrary but distinct literals of the same type, $\uplus$ is duplicate preserving union, and $\times$ is a duplicate preserving cross product, wherein F is a table in a FROM clause of the view definition $V_D$ and $\delta^+F$ and $\delta^-F$ are changes to F representing inserted and deleted rows, respectively, of the received changes, wherein result set $\delta F$ contains all the inserted and deleted rows, with an additional column to distinguish the inserted and deleted rows;

(D) computing result set $\delta G$ as $V'_D(\delta F)$, wherein $V'_D$ is obtained by replacing F in $V_D$ with $\delta F$ and replacing each aggregation expression $a_i$ with three functions $a^+_i, a^-_i$, and $a^d_i$ defined as follows:

(i) if $a_i$ is count, then $a^+_i$ is count(case when f=x then z else NULL end), and $a^-_i$ is count(case when f=y then z else NULL end) where z is expr if the aggregation expression is count(expr) and is some non-null literal, otherwise;

(ii) if $a_i$ is sum(expr), then $a^+_i$ is sum(case when f=x then expr else NULL end), and $a^-_i$ is sum(case when f=y then expr else NULL end);

(iii) if $a_i$ is min(expr), then $a^+_i$ is min(case when f=z then expr else NULL end), and $a^-_i$ is min(case when f=y then expr else NULL end);

(iv) if $a_i$ is max(expr), then $a^+_i$ is max(case when f=x then expr else NULL end), and $a^-_i$ is max(case when f=y then expr else NULL end); and (v) $a^d_i$ is defined as follows:
  $a^d_i = a^+_i - a^-_i$, if $a_i$ is count,
  $a^d_i$=case when isnull($a^+_i$) then $a^+_i$ when isnull($a^-_i$) then $a^+_i$ else $a^+_i - a^-_i$ end, if $a_i$ is sum, and
  $a^d_i = a^+_i$, if $a_i$ is max or min,
wherein if $a_i$ is a distinct aggregation expression, including count distinct or sum distinct, then $a^+_i$ and $a^-_i$ are defined as specified in (D)(i) or (D)(ii) but with the distinct specified in the aggregation expression, wherein if $V_D$ includes sum distinct or count distinct aggregation expressions, then recomputing existing groups in MV that are affected by the changes unless the existing groups in MV that are affected by the changes are to be deleted entirely, wherein, for new groups that do not already exist in MV, recomputation is not necessary only when the delete set is empty; and wherein c denotes one of the count(*) or count( ) expressions and $c^+$ and $c^-$ denote the corresponding $a^+_i$ and $a^-_i$ expressions, respectively, described in (D)(i) and (D)(ii), and if $V_D$ does not contain such an expression, then add $c^+$ and $c^-$ corresponding to a count(*) expression, whereby, $\delta G$ will contain such a pair even though $V_D$ does not contain such an expression;

(E) defining result set $\delta J$ as $\delta G \otimes_p MV$, wherein outerjoin condition p is defined as $\delta F.g_1^N = MV.g_1 \wedge, \ldots, \wedge \delta F.g_m^N = MV.g_m$, and wherein $^N$=operator is optionally replaced by a regular equality=operator for each column $g_i$ that is not nullable;

(F) defining result set $\delta J'$ as $\sigma p(\delta J)$, wherein p is (isnotnull(MV.rowid))$\vee(c^+ > c^-)$ and MV.rowid is the rowid (could actually be any non-nullable) column of MV;

(G) defining result set $\delta J'$ as $I_{p,m}(MV, \delta J')$, wherein p is isnull(MV.rowid)$\wedge p_{nr}$ and $p_{nr}$ is as follows:
  (i) if one of the $a_i$ in $V_D$'s select list is sum(expr) where expr is a FLOAT column or is sum(distinct expr) or is count(distinct expr), then $p_{nr}$ is $c^- = 0$, otherwise $p_{nr}$ is $c^- = 0 \vee (p_{nr1} \wedge \ldots \wedge p_{nrn})$ where each $p_{nri}$ is a predicate corresponding to the aggregation function $a_i$ in $V_D$ as follows:
    if $a_i$ is either count(*) or count(expr), then $p_{nri}$ is TRUE,
    if $a_i$ is sum(expr) and expr is non-nullable, then $p_{nri}$ is TRUE,
    if $a_i$ is sum(expr) of nullable column then $p_{nri}$ is isnull($a^-_i$)$\vee a^+_i <> a^-_i$,
    if $a_i$ is min(expr) then $p_{nri}$ is isnull($a^-_i$)$\vee a^+_i < a^-_i$, and
    if $a_i$ is max(expr) then $p_{nri}$ is isnull($a^-_i$)$\vee a^+_i > a^-_i$,
  wherein a mapping m of expressions from source columns of $\delta J'$ to columns of the target of the insert, MV is as follows: each grouping column from the $\delta G$ component of $\delta J'$ maps to the corresponding grouping column in MV, and for each aggregation expression $a_i$ in $V_D$, the corresponding $a^d_i$ column (from the $\delta G$ component) of $\delta J'$ maps to the corresponding aggregation column in MV;

(H) If at least one of the $a_i$'s is count(distinct expr) or sum(distinct expr), then defining result set $\delta U = \delta I$, else defining result set $\delta U = U_{MV.rowid,p,m}(MV, \delta I)$, wherein p and m are as follows:
  define p' to be $c^- = 0$,
  if at least one of the $a_i$'s is sum(expr) where expr is a FLOAT column, then p is p'$\wedge$isnotnull(MV.rowid),
  otherwise, p is (p'$\vee (p_1 \wedge, \ldots, \wedge p_n))\wedge$isnotnull(MV.rowid) where each $p_i$ corresponds to aggregate expression $a_i$ in $V_D$ and is as follows:
    if $a_i$ is count(expr) or count(*) then $p_i$ is $MV.a_i + a^+_i - a^-_i > 0$,
    if $a_i$ is sum(expr) then $p_i$ is (case when isnull($MV.a_i$) then 0 else $MV.a_i$ end) +(case when isnull($a^+_i$) then 0 else $a^+_i$ end) −(case when isnull($a^-_i$) then 0 else $a^-_i$ end)) <> 0,
    if $a_i$ is min(expr) then $p_i$ is (($a^+_i < a^-_i$)$\vee$ ($MV.a_i < a^-_i$)$\vee$(isnull($a^-_i$)))$\wedge$((isnotnull($a^-_i$))$\vee$(isnotnull($MV.a_i$))),
    if $a_i$ is max(expr) then $p_i$ is (($a^+_i > a^-_i$)$\vee$ ($MV.a_i > a^-_i$)$\vee$(isnull($a^-_i$)))$\wedge$((isnotnull($a^-_i$))$\vee$(isnotnull($MV.a_i$)))
  wherein a mapping m of source expressions to target columns is as follows: each grouping column $g_i$ in $\delta I$ maps to a corresponding grouping column in MV, and for each aggregation expression $a_i$ in $V_D$ a corresponding $u_{ai}$, maps to a corresponding aggregation column $a_i$ in MV, and wherein $u_{ai}$ is defined as follows:
    $u_{ai} = MV.a_i + a^+_i - a^-_i$, if $a_i$ is count(expr) or count(*),
    $u_{ai}$=null-sub(null-add($MV.a_i$, $a^+_i$), $a^-_i$) if $a_i$ is sum(expr),
    $u_{ai}$=null-comp($MV.a_i$, $a^+_i$, <) if $a_i$ is min(expr), and
    $u_{ai}$=null-comp($MV.a_i$, $a^+_i$, >) if $a_i$ is max(expr);

(I) defining result set $\delta D$ as $D_{MV.rowid,TRUE}(MV, \delta U)$;

(J) defining result set $\delta F'$ as $\delta D \bowtie_p R'$, wherein R' represents the result of evaluating all the joins as specified in the view definition $V_D$ and wherein p is $\pi_{R'*}(\delta D.g_1^N = R'.g_1 \wedge, \ldots, \wedge \delta D.g_m^N = R'.g_m$);

(K) defining result set $\delta R''$ as $g\text{-agg}_{\{g1, \ldots, gm\}, \{a1, \ldots, an\}}(\delta F)$; and (L) defining result set $\delta I'$ as $I_{TRUE,m}(MV, \delta R'')$, wherein m maps the columns of $\delta R''$ to their respective columns in MV.

3. A computer-implemented method for maintaining pre-computed aggregate views, comprising:

receiving a pre-computed aggregate view derived from one or more base tables, the pre-computed aggregate view including a pre-computed aggregate table and a view definition, the view definition including aggregation functions that can be any combination of sum, sum distinct, count(*), count distinct, min, and max, the view definition further including expressions that may be nullable;

receiving changes to the one or more base tables, the changes being represented as insertions and deletions and being non-minimal;

tagging insertions and deletions with distinguishing literals and combining the tagged insertions and deletions to define a first result set;

defining a second result set wherein each row shows, for each aggregation function in the view definition, contributions from changes that are insertions and contributions from changes that are deletions;

matching rows from the second result set with rows in the pre-computed aggregate table and defining a third result set containing all rows from the second result set with matched rows tagged with information from corresponding rows in the pre-computed aggregate table and non-matching rows from the second result set tagged as non-matching;

defining a fourth result set by selecting from the third result set rows tagged as matched rows or tagged as non-matching but having more base table changes that are insertions than deletions for the aggregated group represented by the row;

identifying rows in the fourth result set tagged as non-matching rows and that do not require re-computation of aggregation values from detail data;

inserting new rows into the pre-computed aggregate table, the new rows constructed from rows, in the fourth result set, and identified as non-matching rows and not requiring re-computation of aggregation values from detail data;

defining a fifth result set by removing the identified rows from the fourth result set;

defining a sixth result set, wherein when the view definition contains sum distinct or count distinct, defining the sixth result set to be the fifth result set, and wherein when the view definition does not contain sum distinct or count distinct, identifying and updating rows, in the pre-computed aggregate table, that do not require deletion and that match rows in the fifth result set whose new aggregation values can be determined from the corresponding values in the fifth result set, and further removing from the fifth result set rows corresponding to the identified rows to define the sixth result set;

deleting rows, in the pre-computed aggregate table, matching rows in the sixth result set, and defining a seventh result set containing all of the sixth result set; and joining the seventh result set to the one or more base tables that have been changed in accordance with the received changes, and aggregating and inserting rows constructed from an aggregated result into the pre-computed aggregate table.

4. The method of claim 3, wherein defining a second result set includes:

setting conditional expressions in an aggregation function such that contributions from changes that are insertions and contributions from changes that are deletions are distinguishable.

5. The method of claim 3, wherein receiving a pre-computed aggregate view includes:

receiving a view definition that does not include count(*).

6. The method of claim 3, wherein receiving a pre-computed aggregate view includes:

receiving a view definition that includes a sum aggregation function whose input expression is nullable.

7. The method of claim 3, wherein receiving a pre-computed aggregate view includes:

receiving a view definition that includes a sum aggregation function whose input expression is nullable, the view definition not including a count aggregation function having the same input expression as the input expression of the sum aggregation function.

8. The method of claim 3, wherein compare, subtract, and add operations are defined to handle nulls accurately.

9. The method of claim 3, wherein receiving a pre-computed aggregate view includes:

receiving a view definition that includes any combination of count(distinct) and sum(distinct).

10. The method of claim 3, wherein identifying a row as not requiring re-computation of aggregation values from detail data includes analyzing values in the row, and wherein the analysis depends on the aggregation functions in the view definition and their corresponding input expressions.

11. The method of claim 3, wherein identifying a row that does not require deletion includes analyzing values in the row, and wherein the analysis depends on the aggregation functions in the view definition and their corresponding input expressions.

12. The method of claim 3, wherein identifying a row, in the fifth result set, whose new aggregation value can be determined from corresponding values in the fifth result set includes analyzing values in the row, and wherein the analysis depends on the aggregation functions in the view definition and their corresponding input expressions.

* * * * *

UNITED STATES PATENT AND TRADEMARK OFFICE
CERTIFICATE OF CORRECTION

| | | |
|---|---|---|
| PATENT NO. | : 6,735,587 B2 | |
| APPLICATION NO. | : 09/917436 | |
| DATED | : May 11, 2004 | |
| INVENTOR(S) | : Latha S. Colby, William J. McKenna and David G. Wilhite, Jr. | |

It is certified that error appears in the above-identified patent and that said Letters Patent is hereby corrected as shown below:

Column 9
 Line 9, delete "J$\delta$'" and insert --$\delta$J'--
 Line 22, delete "aggregation column" and insert --aggregation expression--

Column 12
 Line 19, delete "column $a_i$" and insert -- expression $a_i$--

Column 15
 In claim 1, please delete lines 56-62 and insert therefore:

--(E) defining result set $\delta J$ as $\delta G \otimes {}_p MV$, wherein the outerjoin condition, $p$, is: $\delta F.g_1^N = MV.g_1 \Lambda, \ldots, \Lambda\, \delta F.g_m^N = MV.g_m.$, and wherein the = operator is optionally replaced by a regular equality = operator for each grouping column g, that is not nullable;--

Column 17
 In claim 2, please delete lines 24-28 and insert therefore:

--(E) defining result set $\delta J$ as $\delta G \otimes {}_p MV$, wherein outerjoin condition $p$ is defined as $\delta F.g_1^N = MV.g_1 \Lambda, \ldots, \Lambda\, \delta F.g_m^N = MV.g_m$, and wherein $^N =$ operator is optionally replaced by a regular equality = operator for each column $g_i$ that is not nullable;--

UNITED STATES PATENT AND TRADEMARK OFFICE
CERTIFICATE OF CORRECTION

PATENT NO.         : 6,735,587 B2
APPLICATION NO. : 09/917436
DATED                  : May 11, 2004
INVENTOR(S)        : Latha S. Colby, William J. McKenna and David G. Wilhite, Jr.

It is certified that error appears in the above-identified patent and that said Letters Patent is hereby corrected as shown below:

Column 18
  In claim 2, please delete lines 27-30 and insert therefore:

--(J) defining result set $\delta F'$ as $\delta D \bowtie_p R'$, wherein R' represents the result of evaluating all the joins as specified in the view definition $V_D$ and wherein p is $\Pi_{R'*}(\delta D.g_1^N = R'.g_1 \; \Lambda, \; ..., \; \Lambda \; \delta D.g_m^N = R'.g_m);$--

Signed and Sealed this

Seventeenth Day of June, 2008

JON W. DUDAS
*Director of the United States Patent and Trademark Office*